US010827305B2

(12) United States Patent
Odejerte, Jr.

(10) Patent No.: US 10,827,305 B2
(45) Date of Patent: Nov. 3, 2020

(54) SYSTEM AND METHOD FOR LOCATING A WIRELESS COMMUNICATION DEVICE WITH RESPECT TO A VEHICLE

(71) Applicant: Huf North America Automotive Parts Manufacturing Corp., Milwaukee, WI (US)

(72) Inventor: Antonio Odejerte, Jr., Farmington Hills, MI (US)

(73) Assignee: Huf North America Automotive Parts Manufacturing Corp., Milwaukee, WI (US)

( * ) Notice: Subject to any disclaimer, the term of this patent is extended or adjusted under 35 U.S.C. 154(b) by 142 days.

(21) Appl. No.: 16/311,093

(22) PCT Filed: Jun. 21, 2017

(86) PCT No.: PCT/US2017/038464
§ 371 (c)(1),
(2) Date: Dec. 18, 2018

(87) PCT Pub. No.: WO2018/005182
PCT Pub. Date: Jan. 4, 2018

(65) Prior Publication Data
US 2020/0314590 A1    Oct. 1, 2020

Related U.S. Application Data

(60) Provisional application No. 62/356,015, filed on Jun. 29, 2016.

(51) Int. Cl.
*H04W 4/02*    (2018.01)
*H04W 4/40*    (2018.01)
(Continued)

(52) U.S. Cl.
CPC ............. *H04W 4/023* (2013.01); *G01S 11/06* (2013.01); *G01S 13/825* (2013.01);
(Continued)

(58) Field of Classification Search
CPC ...................................................... H04W 4/023
(Continued)

(56) References Cited

U.S. PATENT DOCUMENTS

| 2015/0148989 A1 | 5/2015 | Cooper et al. |
| 2016/0063786 A1 | 3/2016 | Lewis et al. |
| 2017/0026791 A1 | 1/2017 | Weizman et al. |

FOREIGN PATENT DOCUMENTS

WO    WO-2015099751 A1    7/2015

OTHER PUBLICATIONS

International Search Authority (EPO), International Preliminary Report on Patentability for International Application No. PCT/US2017/038464, dated Jan. 1, 2019.
(Continued)

*Primary Examiner* — Joel Ajayi
(74) *Attorney, Agent, or Firm* — Honigman LLP; Matthew H. Szalach; Jonathan P. O'Brien

(57) ABSTRACT

A method for determining a location of a vehicle access device relative to a vehicle is disclosed. The method includes receiving, at a first communication node of the vehicle, an advertisement from the vehicle access device, and transmitting a connection request to the vehicle access device associated with the received advertisement. The method includes establishing, at the first communication node, a connection with the vehicle access device, and determining a general location of the vehicle access device. When the general location of the vehicle access device is less than a threshold distance, the method includes transmitting, from the first communication node, a high duty
(Continued)

cycle advertisement command to a second communication node in communication with the first communication node. The method includes receiving, at the first communication node, a signal from the vehicle access device, the signal indicative of a location of the vehicle access device relative to the vehicle.

20 Claims, 7 Drawing Sheets

(51) Int. Cl.
    *H04W 4/80*     (2018.01)
    *G01S 13/87*     (2006.01)
    *G01S 13/82*     (2006.01)
    *G01S 11/06*     (2006.01)
    *H04W 76/14*     (2018.01)

(52) U.S. Cl.
    CPC ............ *G01S 13/878* (2013.01); *H04W 4/40* (2018.02); *H04W 4/80* (2018.02); *H04W 76/14* (2018.02)

(58) Field of Classification Search
    USPC ...................................... 455/456.1
    See application file for complete search history.

(56) References Cited

OTHER PUBLICATIONS

International Searching Authority (EPO), International Search Report and Written Opinion for International Application No. PCT/US2017/038464, dated Aug. 17, 2017.

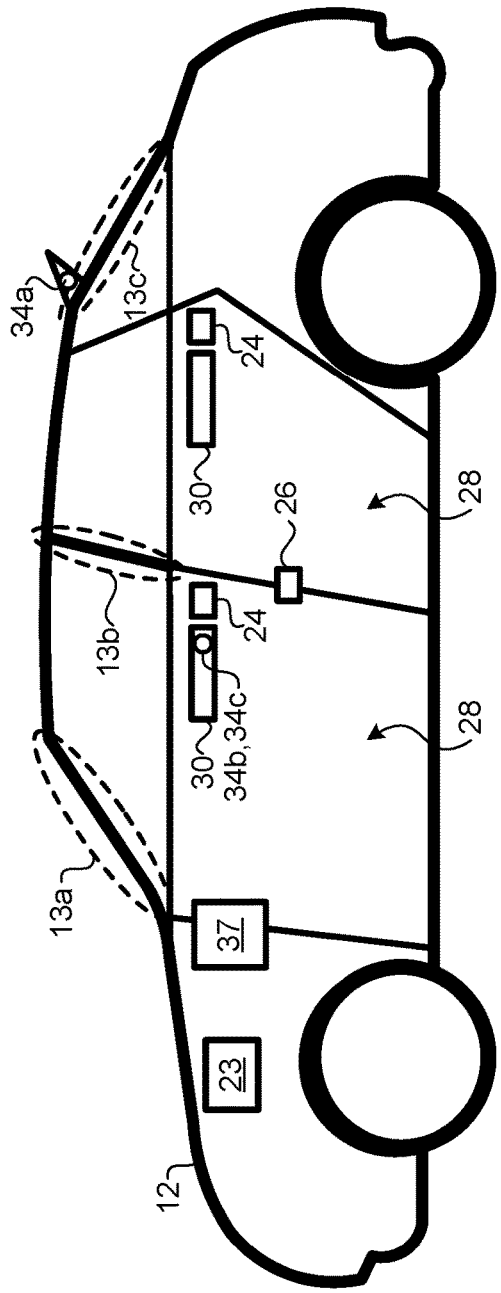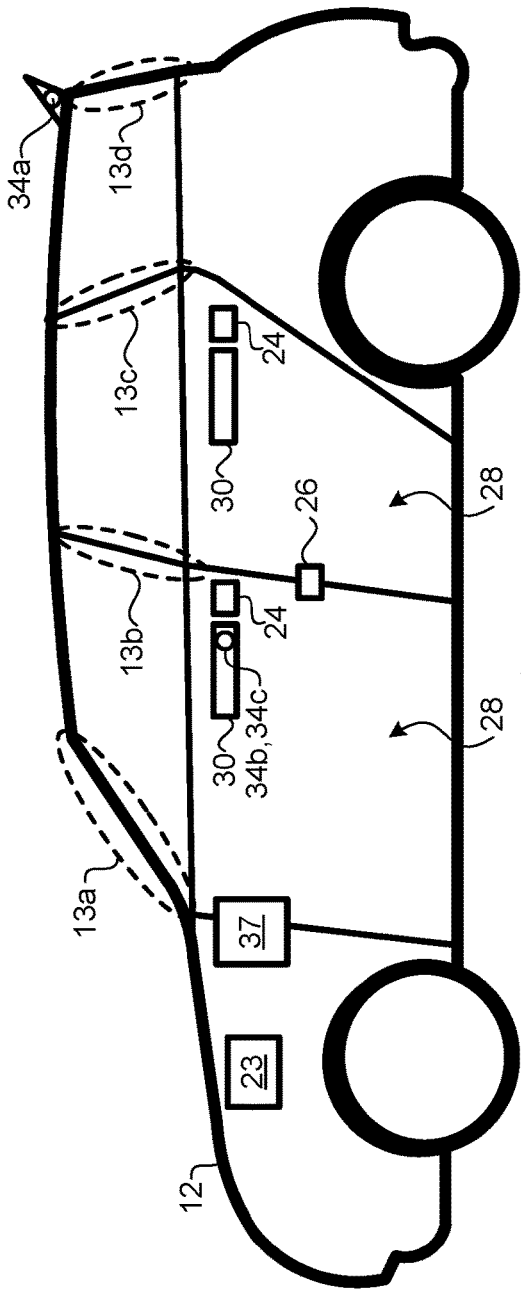

SYSTEM AND METHOD FOR LOCATING A WIRELESS COMMUNICATION DEVICE WITH RESPECT TO A VEHICLE

CROSS REFERENCE TO RELATED APPLICATIONS

This application is the national phase of International Patent Application No. PCT/US2017/038464, filed Jun. 21, 2017, which claims the benefit of U.S. Provisional Patent Application Ser. No. 62/356,015, filed Jun. 29, 2016, the disclosures of which are hereby incorporated by reference in their entirety.

FIELD

The present disclosure relates generally to a system and method for locating a wireless communication device with respect to a vehicle.

BACKGROUND

This section provides background information related to the present disclosure and is not necessarily prior art.

A wireless communication device, such as a smartphone, a smart watch, or a computer (e.g., a tablet, laptop, personal digital assistant, etc.), for example, can be used to communicate with a motor vehicle. For example, a wireless communication device may communicate with a vehicle in order to access, diagnose faults, start/stop, and/or provide power to certain components and/or systems within the vehicle. In particular, a user may utilize a wireless communication protocol (e.g., short-range radio wave communication, Wi-Fi, BLUETOOTH®, near field communication (NFC), etc.) to access and/or operate the vehicle. For example, the operator may access and/or operate the vehicle by utilizing a wireless communication protocol controlled and powered by a smartphone.

When utilizing the wireless communication device to access and/or operate the vehicle, communication between the wireless communication device and the vehicle can be adversely affected by various environmental factors and/or conditions. The environmental factors and/or conditions may include, but are not limited to, a distance between the wireless communication device and the vehicle, weather conditions (e.g., clouds, rain, snow, etc.) at the location of the wireless communication device and/or the vehicle, existence of any barriers (e.g., wall, buildings, people, clothing, etc.) between the wireless communication device and the vehicle, and the orientation of the wireless communication device relative to the vehicle. These various environmental conditions may make it difficult to accurately determine the location of the wireless communication device relative to the vehicle. In particular, environmental conditions may make it difficult to accurately determine the distance between the wireless communication device and the vehicle and, more specifically, the location of the wireless communication device with respect to the vehicle. For example, determining if the wireless communication device is near the front right/left door, back right/left door, or the trunk.

While known systems and methods for determining the location of, and/or distance between, a wireless communication device and a vehicle have proven to be acceptable for their intended use, such systems are typically sensitive to various environmental conditions between, and surrounding, the wireless communication device and the vehicle. Such sensitivity to environmental conditions can make it difficult to accurately determine the location of, and/or distance between, the wireless communication device and the vehicle, thereby making it difficult to access and/or operate the vehicle with the wireless communication device.

SUMMARY

This section provides a general summary of the disclosure, and is not a comprehensive disclosure of its full scope or all of its features.

One aspect of the disclosure provides a method for determining a location of a vehicle access device relative to a vehicle. The method includes receiving, at a first communication node of the vehicle, an advertisement from the vehicle access device. The method also includes transmitting, from the first communication node, a connection request to the vehicle access device associated with the received advertisement. The method also includes establishing, at the first communication node, a connection with the vehicle access device. In addition, the method includes determining, at the first communication node, a general location of the vehicle access device. When the general location of the vehicle access device is less than a threshold distance, the method includes transmitting, from the first communication node, a notification to the vehicle access device. The notification is indicative of a notice to scan for a high duty cycle advertisement. The method also includes transmitting, from the first communication node, a high duty cycle advertisement command to a second communication node of the vehicle in communication with the first communication node. In response to receiving the high duty cycle advertisement command at the second communication node, the method includes transmitting a high duty cycle advertisement for a duration of time. In addition, the method includes receiving, at the first communication node, a signal from the vehicle access device, the signal indicative of a location of the vehicle access device relative to the vehicle.

Implementations of the disclosure may include one or more of the following optional features. In some implementations, the threshold distance is a distance from the vehicle of about five meters or less. The duration of time for transmitting the high duty cycle advertisement from the second communication node may be about 1.28 seconds. The method may also include transmitting signal strength indication values from the first and second communication nodes to the vehicle access device. The first communication node, the second communication node, and the vehicle access device may support Bluetooth Low Energy (BLE) personal area network technology.

Another aspect of the disclosure provides a system for determining a location of a vehicle access device relative to a vehicle. The system includes a first communication node and a second communication node in communication with the first communication node. The first communication node is configured to receive an advertisement from the vehicle access device and transmit a connection request to the vehicle access device associated with the received advertisement. The first communication node is also configured to establish a connection with the vehicle access device and determine a general location of the vehicle access device. When the general location of the vehicle access device is less than a threshold distance, the first communication node is configured to transmit a notification to the vehicle access device for a period of time. The notification is indicative of a notice to scan for a high duty cycle advertisement. The first communication node is also configured to transmit a high duty cycle advertisement command. The second communication node is configured to receive the high duty cycle advertisement command from the first communication node and transmit a high duty cycle advertisement for a duration of time. In response to transmitting the high duty cycle advertisement for the duration of time, the first communication node receives a signal from the vehicle access device. The signal is indicative of a location of the vehicle access device relative to the vehicle.

Implementations of the disclosure may include one or more of the following optional features. In some implementations, the threshold distance is a distance from the system of about five meters or less. The duration of time for transmitting the high duty cycle advertisement from the second communication node may be about 1.28 seconds. The first and second communication nodes may each transmit signal strength indication values to the vehicle access device. The first communication node, the second communication node, and the vehicle access device may support Bluetooth Low Energy (BLE) personal area network technology.

Yet another aspect of the disclosure provides a method for determining a location of a vehicle access device relative to a vehicle. The method includes transmitting, from data processing hardware associated with the vehicle access device, an advertisement to the vehicle, and receiving, at the data processing hardware, a notification from the vehicle. The notification is indicative of a notice to scan for a high duty cycle advertisement. In response to the notification, the method includes scanning, at the data processing hardware, for high duty cycle advertisements, and receiving, at the data processing hardware, signal strength indication values associated with the high duty cycle advertisements. The method also includes determining, at the data processing hardware, a location of the vehicle access device with respect to the vehicle based on the received signal strength values, and transmitting, from the data processing hardware to the vehicle, the location of the vehicle access device relative to the vehicle.

Implementations of the disclosure may include one or more of the following optional features. In some implementations, the method includes receiving, at the data processing hardware, a connection request to connect the data processing hardware to the vehicle. The signal strength indication values may be received from at least one node of the vehicle. 45 The high duty cycle advertisement may be received for intervals having a duration of about 1.28 seconds. The vehicle access device may include one of a smartphone, a smart watch, and a tablet-computing device.

Yet another aspect of the disclosure provides a vehicle access device. The device includes data processing hardware, a screen in communication with the data processing hardware, and memory hardware in communication with the data processing hardware. The memory hardware stores instructions that when executed on the data processing hardware, cause the data processing hardware to perform operations. The operations include transmitting an advertisement to the vehicle and receiving a notification from a vehicle. The notification is indicative of a notice to scan for a high duty cycle advertisement. In response to the notification, the operations include scanning for high duty cycle advertisements, and receiving signal strength indication values associated with the high duty cycle advertisements. The operations further include determining a location of the vehicle access device with respect to the vehicle based on the received signal strength values, and transmitting the location of the vehicle access device relative to the vehicle.

Implementations of the disclosure may include one or more of the following optional features. In some implementations, the operations further include receiving a connection request to connect the data processing hardware to the vehicle. The signal strength indication values may be received from at least one node of the vehicle. The high duty cycle advertisement may be received for intervals having a duration of about 1.28 seconds. The vehicle access device may include one of a smartphone, a smart watch, and a tablet computing device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

FIGS. 3A and 3B are functional block diagrams of the example vehicle communication system of FIG. 1;

Corresponding reference numerals indicate corresponding parts throughout the drawings.

DETAILED DESCRIPTION

Figure 1:
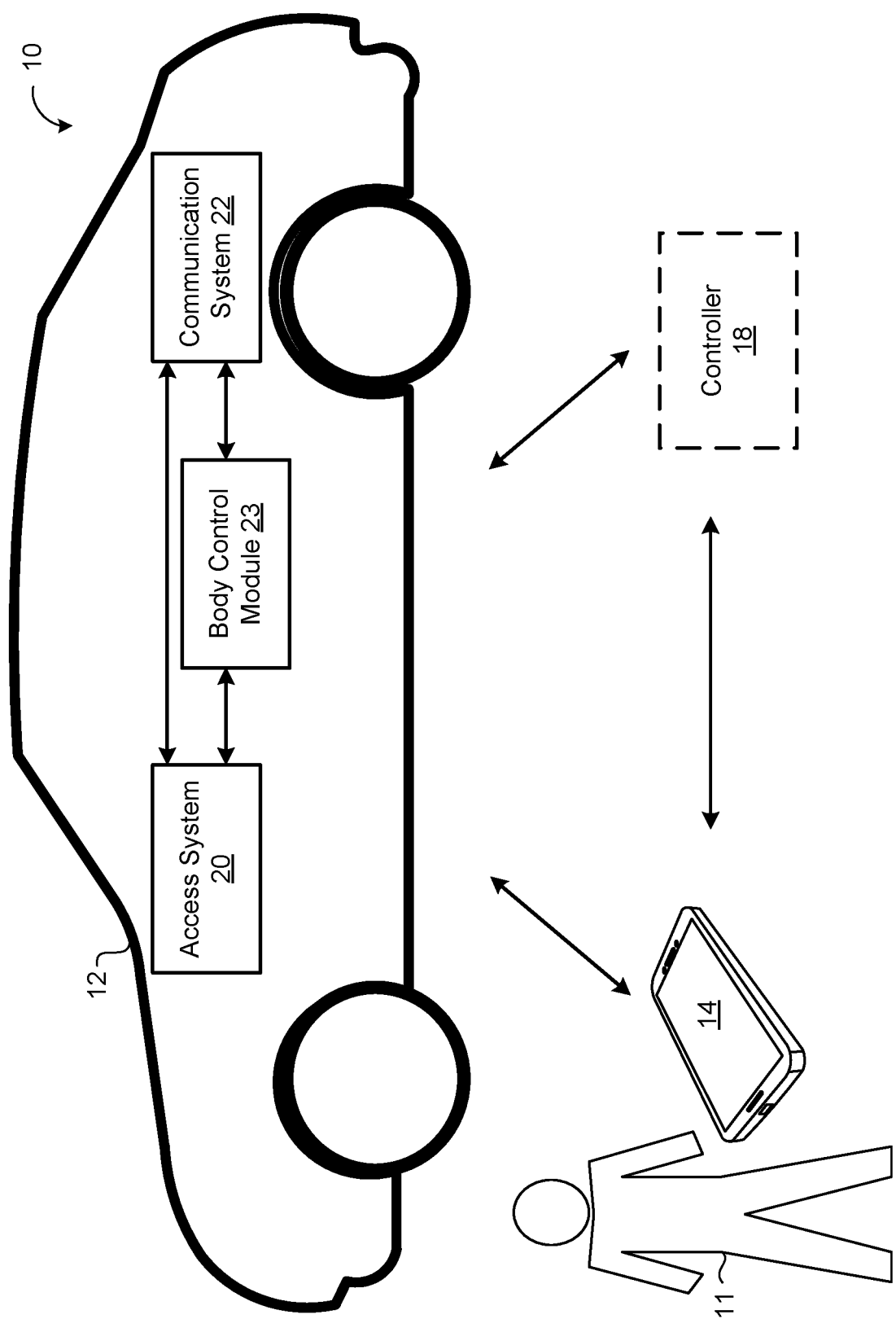
FIG. 1 is a functional block diagram of an example vehicle communication system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

The description provided herein is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A vehicle access device, such as a smartphone, may be used to access and control some features of a vehicle. In some examples, both the vehicle access devices and the vehicle support BLUETOOTH® Low Energy (BLE) personal area network technology, which allows communication between the vehicle access device and the vehicle. In some examples, the vehicle and/or the vehicle access device implements a localization strategy/algorithm to determine a location of the vehicle access device with respect to the vehicle. BLE technology uses 2.4 Gigahertz operating radio frequencies to communicate, which is the same frequencies used by classic BLUETOOTH®. In some examples, environmental factors affect the quality of the communication. To determine a relative location of the vehicle access device 14, the vehicle gathers as many received signal strength indicators (RSSIs) from the vehicle access device and uses all or most of the gathered RSSIs to determine the RSSI value that the vehicle uses to determine a relative position of the vehicle access device with respect to the vehicle. In an IEEE 802.11 system, RSSI is the relative received signal strength in a wireless environment, in arbitrary units.

When a device wants to establish communication with another device using BLE protocols, the first device advertises its presence using, for example, three RF channels that are dedicated for advertising functions. Another device within a threshold distance from the first device may be scanning for devices sending advertisements. The first and second devices may initiate communication by finding one another, when one device is advertising and the second device is scanning for advertisers. In some examples, a vehicle access device, such as a smartphone, may limit the allowable time that the vehicle access device may advertise its presence. For example, the allowable time may be greater than or equal to 20 milliseconds to both conserve battery life and because the advertisement channels are typically also used to establish Wi-Fi and other communication protocols. In addition, in some examples, the vehicle may have a threshold period of time (e.g., less than one second) to determine the relative location of the vehicle access device with respect to the vehicle. As such, it is desirable to design a vehicle communication system 10 (see FIGS. 1 and 2) that considers the vehicle access device advertisement time limit in addition to the vehicle time limitations to attain an accurate determination of the vehicle access device, while considering latency and power consumption requirements of the vehicle access device and the vehicle.

With reference to FIGS. 1-3B, the vehicle communication system 10 is provided. The vehicle communication system 10 may include a vehicle 12, a vehicle access device 14, and a vehicle control center 18 (also referred to as a controller). The vehicle 12 may be any known variety of motorized vehicle, such as a car, truck, or van, for example. In this regard, the vehicle 12 may be a private or commercial-type motor vehicle. In some configurations, the vehicle 12 may be one of a group of vehicles 12 that make up part of a fleet of vehicles, such as a fleet of rental vehicles or a fleet of commercial vehicles, such as delivery vehicles or service vehicles.

The vehicle 12 may include an access system 20, a communication system 22, and a body control module 23. The access system 20 may include one or more locks 24, 24a-n, a locking module 26, and one or more doors 28 and/or other access location(s). The locks 24 may permit and/or prevent access to the vehicle 12 through the doors 28. For example, each door 28 of the vehicle 12 may include a lock 24 and a handle 30. In particular, the locking module 26 may communicate with the lock(s) 24 to permit and/or prevent operation of the handle 30 in order to permit and/or prevent access to the vehicle 12 through the doors 28. As such, the locking module 26 may receive a signal from the vehicle access device 14 and control a state (e.g., locked or unlocked) of the lock(s) 24 based on the signal(s) received from the vehicle access device 14.

The communication system 22 may include one or more wireless communication nodes 34, 34a-n, a communication application 36, and an infotainment system 37. For example, in some configurations, the communication system 22 includes three wireless communication nodes 34. In particular, the communication system 22 may include a primary or main wireless communication node 34a, a first secondary communication node 34b, and a second secondary communication node 34c.

Referring to FIGS. 3A and 3B, a vehicle 12 may include an A-pillar 13a, a B-pillar 13b, a C-pillar 13c, and in some examples a D-pillar 13d. The D-pillar 13d may be used in station-wagons and sports utility vehicles (SUVs). The A-pillars 13a are the structural elements of the vehicle 12 that generally support the windshield and vehicle roof. Each successive vertical support after the A-pillar likewise supports the vehicle roof and is denoted by successive letters in the alphabet. As such, the B-pillars 13b start where the driver and passenger-side windows end. The C-pillars 13c are disposed aft of the B-Pillars and between the B-Pillars and the D-Pillars (if present). The D-Pillars 13d are the rear-most roof support structure and are typically only present in sport utility vehicles (SUVs), minivans, and station-wagons.

The communication nodes 34 may be located in various locations on and/or in the vehicle 12. For example, the primary wireless communication node 34a is located on a body portion of the vehicle 12. In particular, in some configurations, the primary wireless communication node 34a may be located on the C-pillar 13c of the vehicle 12 as shown in FIG. 3A. In other examples, the primary wireless communication node 34a is located on the D-pillar 13d of the vehicle 12, as shown in FIG. 3B. The first and/or second communication nodes 34b, 34c, may each be located on one of the doors 28 of the vehicle 12. For example, in some configurations, the first secondary communication node 34b is located on the door handle 30 on a driver's side of the vehicle 12, and the second secondary communication node 34c is located on the door handle 30 on a passenger's side of the vehicle 12. In other examples, the communication system 22 includes four secondary communication nodes 34a-34d, and each one of the four secondary communication nodes 34a-34d is located on a door handle 30 of the vehicle, including front and rear driver and passenger door handles 30. The role of each BLE node 34 being the primary node or the secondary node is not fixed. As such, in some examples, the primary node 34a located on the C-pillar 13c may become the second secondary node, while the second secondary node becomes the primary node. In this case, the primary node is located on the door handle 30 of the vehicle 12.

As will be explained in more detail below, each wireless communication node 34 may be configured to communicate with the other wireless communication node(s) 34. For example, the wireless communication nodes 34 of the vehicle 12 may communicate with one another, and with the vehicle access device 14, through one or more wired and/or wireless communication protocols, such as LIN Communication, short-range radio wave communication, Wi-Fi, BLUETOOTH®, and/or BLUETOOTH® Low Energy (BLE) (e.g., Mesh BLE). In this regard, the wireless communication nodes 34 may be referred to herein as BLE communication nodes 34. In some examples, the wireless communication nodes 34 may communicate with other wireless communication nodes, such as, the wireless communication node 52 of the vehicle access device 14.

The BLE communication nodes 34a-n may each include a BLE address. The BLE address may include one or more of a UUID address, a major address, a minor address, and transmit power information. The UUID address may be a string used to differentiate a large group of related nodes. For example, the UUID is used to identify that a node 34 is associated with a vehicle 12. The major address is a string used to distinguish a smaller subset of the nodes 34 within the larger group of nodes 34. For example, the major address is used to identify a specific car within a group of cars. The minor address is a string used to identify an individual node 34 within the group of nodes associated with the specific vehicle 12 identified by the major address. The transmit power information may be used to determine an estimated distance of a vehicle access device 14, for example, from the identified individual node 34. As such, each BLE communication node 34a-n includes the same major address to associate the node 34 with the corresponding vehicle 12. However, each node 34 associated with the vehicle 12 includes a different minor address to differentiate each node 34 from another node 34 of the vehicle 12. The vehicle access device 14 uses the UUID address to identify that a node 34 is associated with a vehicle 12. The vehicle access device 14 uses the major address to identify that the node 34 is associated with a specific vehicle 12 when there are more than one vehicle 12 having nodes 34. Finally, the vehicle access device 14 uses the minor address to identify and differentiate which node 34 the vehicle access device 14 is being used to communicate with the vehicle 12.

In some examples, the vehicle access device 14 includes a table that groups the BLE communication nodes 34a-n associated with a specific vehicle 12. Using the BLE addresses, including the minor BLE addresses, can help the vehicle access device 14 determine which of the BLE communication nodes 34a, 34b, 34c the vehicle access device 14 should communicate with when there is more than one vehicle 12.

The communication application 36 may allow the vehicle 12 to communicate with the vehicle access device 14 and/or with the vehicle control center 18. For example, the communication application 36 may implement a wireless communication protocol that allows the vehicle 12 to wirelessly send and receive messages to and/or from the vehicle access device 14 and/or the vehicle control center 18.

The communication application 36 may be a native application or a web application. A native application may refer to an application that is installed on a device, such as the vehicle 12, the vehicle access device 14, and/or the controller 18. The device may download, install, and execute the native application. A web application may refer to an application that a device, such as the vehicle 12, the vehicle access device 14, and/or the controller 18 can access via a network (e.g., public network, such as the Internet). In some examples, the web application refers to a webpage that the device can access via a web browser. The device may execute the web application, e.g., via a web browser.

Although the communication application 36 is executed on the vehicle 12, the vehicle access device 14 and, optionally, the controller 18, the communication application provides different functionalities and features to each one of the vehicle 12, the vehicle access device 14, and the controller 18. For example, the communication application 36 associated with the vehicle 12 may or may not be accessible to the user. If accessible to the user 11, the communication application 36 may provide access to the vehicle access device 14 by way of the infotainment system 37 (e.g., the display). The communication application 36 associated with the vehicle access device 14 may allow the user to control the vehicle 12. For example, the communication application 36 may allow the user to lock and unlock the doors via the locking module 36, and/or start and stop the engine of the vehicle 12, and/or control a temperature of the vehicle 12. In addition, the communication application 36 associated with the controller 18 allows an operator to give permission to a specific vehicle 12 and/or a specific vehicle access device 14 to communicate with one another.

The infotainment system 37 may allow the vehicle 12 to communicate with the user 11. For example, the infotainment system 37 may include a display (not shown) and/or a speaker (not shown) that allow the infotainment system 37 to send visual and/or audible instructions to the user. In some examples, the user may access the communication application 36 associated with the vehicle 12 by using the display of the infotainment system 37.

The body control module 23 may control various aspects of accessing and/or operating the vehicle 12. For example, the body control module 23 may communicate with the access system 20 and/or the communication system 22 in order to permit or prevent access to the vehicle 12 through the doors 28 and/or to permit or prevent access to the vehicle 12 via the engine (not shown). For example, the body control module 23 may permit or prevent the vehicle access device 14 from operating the engine of the vehicle 12.

The vehicle access device 14 may include a mobile communication device such as a smartphone, a smart watch, or a computer (e.g., a tablet, laptop, personal digital assistant, etc.), for example. The vehicle access device 14 may include a battery 42, the communication application 36, an environment-monitoring application 46, a gyroscope 48, an accelerometer 50, and a wireless communication node 52. The environmental-monitoring application 46 may be configured to determine various environmental conditions at the location of the vehicle access device 14. For example, the environmental-monitoring application 46 may be a weather application configured to determine the temperature, humidity, and/or precipitation conditions at the location of the vehicle access device 14. The gyroscope 48 may be configured to determine an orientation of the vehicle access device 14. The accelerometer 50 may be configured to determine motion-related characteristics of the vehicle access device 14, such as speed, acceleration, and/or deceleration. As will be explained in more detail below, the wireless communication node 52 may be configured to communicate with the vehicle 12 and/or the vehicle control center 18. For example, the wireless communication node 52 may communicate with the wireless communication node(s) 34, through one or more wireless communication protocols, such as short-range radio wave communication, Wi-Fi, BLUETOOTH®, and/or BLUETOOTH® Low Energy (BLE). In this regard, the wireless communication node 52 may be referred to herein as BLE communication node 52.

The vehicle control center 18 may include the communication application 36 and a wireless communication node 54. In some examples, a user associated with a vehicle access device 14 does not have access to a specific vehicle 12. For example, a user may be renting a vehicle 12 from a vehicle rental business. As such, the vehicle control center 18 communicates with one or both of the vehicle 12 and the vehicle access device 14 allowing the vehicle access device to communicate and control a specific rented vehicle 12 (i.e., lock or unlock the vehicle or perform other vehicle functions). The wireless communication node 54 may be configured to communicate with the vehicle 12 and/or the vehicle access device 14. For example, the wireless communication node 54 may communicate with the wireless communication node(s) 34 and/or 52 through one or more wireless communication protocols, such as short-range radio wave communication, Wi-Fi, BLUETOOTH®, and/or BLUETOOTH® low energy (BLE). In this regard, the wireless communication node 54 may be referred to herein as BLE communication node 54.

Figure 2:
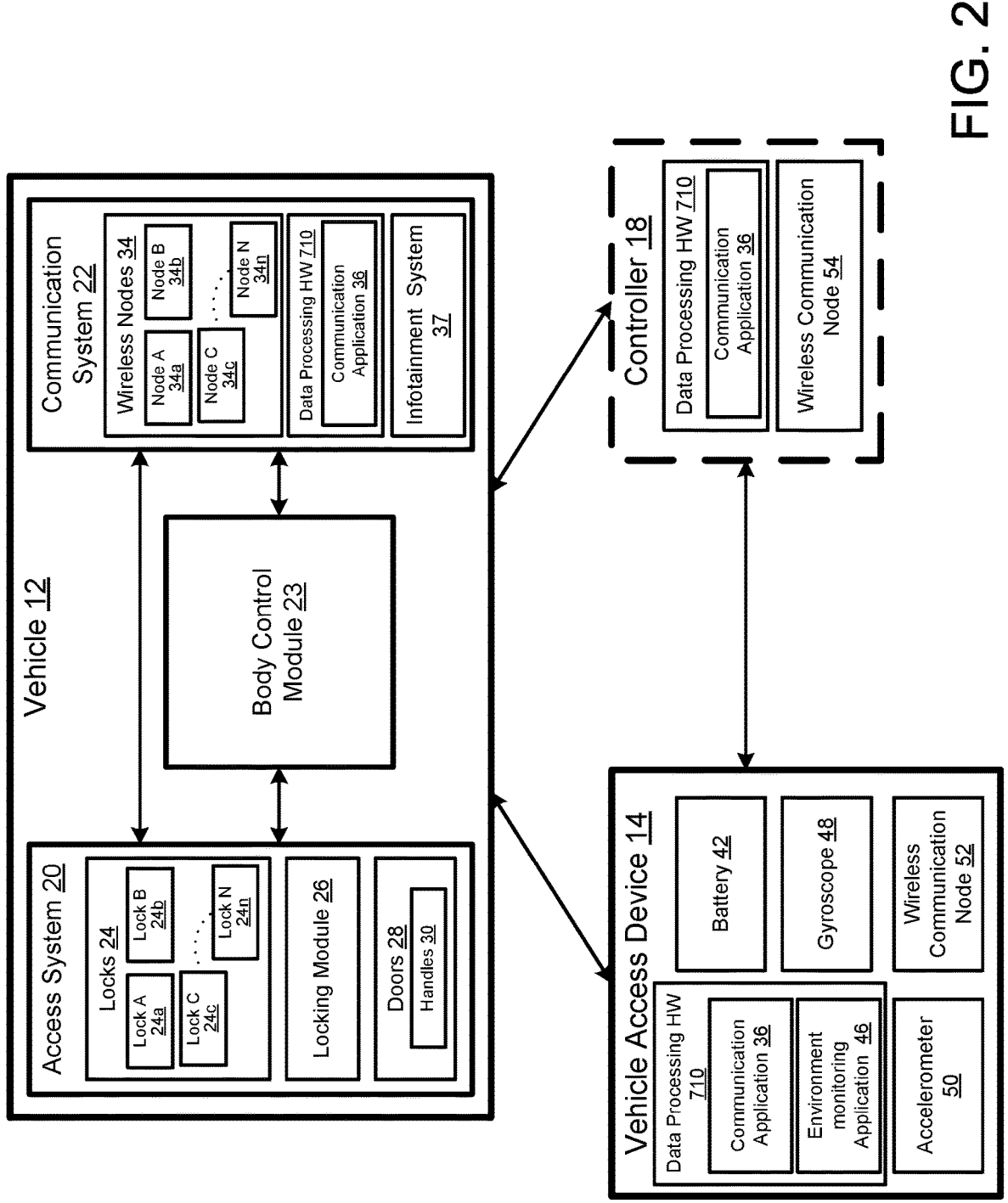
FIG. 2 is another functional block diagram of the example vehicle communication system of FIG. 1.
Figure 4:
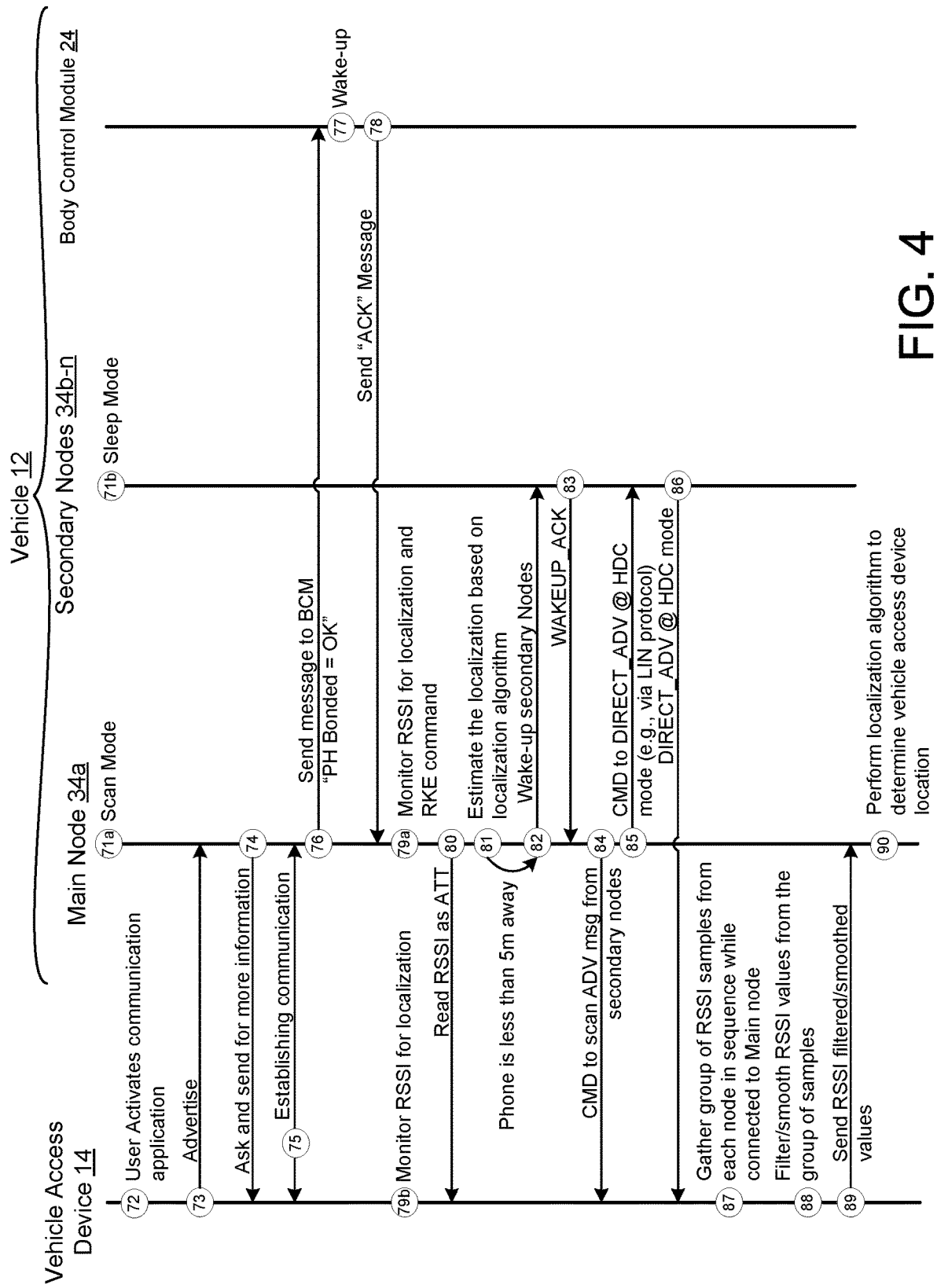
FIG. 4 is a flowchart depicting an example method of controlling a vehicle communication system according to the present disclosure.

FIG. 4 illustrates a method for determining a position of the vehicle access device 14 relative to the vehicle 12, where both the access device 14 and vehicle 12 are described in FIGS. 1-3. In an initial state at step 71a, the main node 34a of the vehicle 12 is in a scan mode to scan for any devices that are advertising data packets. While the main node is scanning for advertised data packets, the secondary nodes 34b-n are in a sleep mode at step 71b. As such, the secondary nodes 34a-n are neither scanning for advertised data packets, nor are they advertising data packets to be scanned by other devices.

At step 72, a user 11 may activate the communication application 36 on his/her vehicle access device 14 to allow the vehicle access device 14 to communicate with the vehicle 12. In particular, activating the communication application 36 may allow the wireless communication node 52 to communicate with the wireless communication nodes 34, 34a-n. Once the user 11 activates the communication application 36, the communication application 36 sends the wireless communication node 52 associated with the vehicle access device 14 a command to begin advertising BLE packets for reception by the main node 34a. As such, at step 73, the vehicle access device 14 and, more specifically, the wireless communication node 52, begins to advertise its presence to other devices.

At step 74, the vehicle 12 (i.e., the main node 34a) that is in scan mode (see step 71a) may scan and/or search for wirelessly transmitted information. For example, one or more of the wireless communication nodes 34a-n may scan for BLE packets. In particular, the wireless communication node 34a, 34b, and/or 34c may scan in pre-defined intervals of time, and/or within a predefined period of time, for BLE packets advertised from the vehicle access device 14. As shown, the primary wireless communication node 34a may scan for BLE packets advertised from the vehicle access device 14 while the secondary communication nodes 34b-n may be in sleep mode (e.g., deactivated).

It will be appreciated that, before and/or after scanning for BLE packets advertised from the vehicle access device 14, the vehicle 12 may request that the user 11 place the vehicle access device 14 in a location and/or an orientation relative to the vehicle 12. For example, the infotainment system 37 (via the display or speakers) may request that the user 11 place the vehicle access device 14 within a detection range (e.g., a predefined distance) of one or more of the wireless communication nodes 34. In this case, in some implementations, the infotainment system 37 may send a visual and/or audio signal to the user requesting that the vehicle access device 14 be placed in a particular location and/or a particular orientation relative the vehicle 12. For example, the infotainment system 37 may request that the vehicle access device 14 be placed outside of a window of the door 28 (e.g., the driver's side door) of the vehicle 12 and/or oriented towards the vehicle 12 (e.g., horizontal, vertical, etc.) while the application 36 is activated.

In addition, at step 74, the vehicle 12 sends a message to the advertising vehicle access device 14 to send more information (e.g., position from the gyroscope 48 and accelerometer 50, and/or information from the environment monitoring application 46).

At Step 75, the vehicle access device 14 sends the main node 34a the requested information, which results in establishing a connection between the wireless communication node 52 of the vehicle access device 14 and the main node 34a of the vehicle 12. In some examples, step 75 may include an authentication process when the communication system 10 includes a controller 18. In this case, the primary wireless communication node 34a may request and/or receive authentication information from the wireless communication node 52 in order to determine whether the vehicle access device 14 is permitted to access the vehicle 12.

At step 76, the main node 34a sends a message to the body control module 23, indicating that the main node 34a and the vehicle access device 14 have established communication, i.e., the main node 34a and the vehicle access device 14 are communicating.

At step 77, the body control module 23 wakes up from a previous sleeping modes and awaits a control command from the main node 34a and/or the vehicle access device 14. The control command may be to lock or unlock the vehicle 12, to start the engine of the vehicle 12, or to adjust the temperature of the vehicle 12 while the engine is running. For example, the user 11 may use the communication application 36 to send a control command to the vehicle 12 via the wireless communication node 52 of the vehicle access device 14 to the main node 34a of the vehicle 12. The vehicle 12, in turn, sends the control command to the body control module 23, which sends the control command to the corresponding device (e.g., engine, heating venting and cooling (HVAC) module).

At step 78, the body control module 23 sends the main node 34a an acknowledgment message "ACK" indicating that the body control module 23 received the message from the main node 34a, which in turn indicates that the main node 34a is communicating with a vehicle access device 14. In addition, the acknowledgment message "ACK" indicates that the body control module 23 is ready to receive a control command from the main node 34a.

Steps 79a and 79b may occur simultaneously. At step 79a the main node 34a monitors RSSI values received from the vehicle access device 14 to determine a general location of the vehicle access device 14. In addition, the main node 34a may be in receipt of remote keyless entry (RKE) messages or control commands from the vehicle access device 14. Similarly, at step 79b, the vehicle access device 14 monitors RSSI values received from the main node 34a to determine a general location of the main node 34a.

At step 80, the main node 34a reads the RSSI value over the attribute protocol (ATT). ATT defines how to transfer a unit of data, and is used by devices supporting BLE. ATT is used to discover services, read, and write characteristic values on peer devices.

At step 81, the main node 34a estimates the localization of the vehicle access device 14 bases on the read RSSI values at step 80 and localization algorithms resulting in a general location of the vehicle access device 14.

When the main node 34a estimates that the general location of the vehicle access device 14 is within a threshold distance (e.g., five meters), at step 82, the main node 34a sends a wake-up message to the secondary nodes 34b-n to alter the sleeping mode (Step 71b) of the secondary nodes 34b-n. As such, the secondary nodes 34b-n wake up and send a wake-up acknowledgement message to the main node 34a at step 83.

When all of the secondary nodes 34b-n are awake, at step 84, the main node 34a then sends a command to scan for advertisement messages from the secondary nodes 34b-n. As such, the main node 34a gives the vehicle access device 14 a notice to be prepared for the high duty cycle mode messages.

At block 85, the main node 34a sends a command to the secondary nodes 34b-n to directly advertise in the high duty cycle (HDC) mode (i.e., 3.75 milliseconds for a duration of 1.28 seconds). Other durations of time may be possible as well. In some examples, the main node 34a uses Local Interconnect Network (LIN) protocol or a private bus to send the command to the secondary nodes 34b-n to directly advertise at the HDC mode. Other protocols may also be used to communicate between the nodes 34.

At block 86, each one of the secondary nodes 34b-n transmits a direct advertisement message at the high duty cycle mode.

At block 87, the vehicle access device 14 gathers groups of RSSI sample values from each one of the secondary nodes 34b-n in sequence while still connected to the main node 34a. In this case, the vehicle access device 14 operates in a multi-role (i.e., scatternet mode). This means that while being connected to the main node 34a as the advertiser, the vehicle access device 14 also acts as the scanner at the same time. As previously described, each node 34 has its own unique identification (e.g., major and minor address). As such, the vehicle access device knows which node 34b-n is associated with each received RSSI sample value.

When the vehicle access device 14 gathers the groups of RSSI values associated with each secondary node 34b-n, at step 88, the vehicle access device 14 then executes an algorithm to filter and smooth RSSI sample values.

At step 89, the vehicle access device 14 sends the result RSSI value to the main node 34a for further localization operations at step 90. When the main node 34a performs the final localization algorithm using the received result RSSI value, the relative location of the vehicle access mechanism 14 is determined. The main node 34a sends the relative location to the body control module 23.

The steps and operations described in FIG. 4 improve the latency and accuracy of determining the relative location of the vehicle access device 14 with respect to the vehicle 12. For example, a system has an advertisement constraint of 300 milliseconds to gather RSSI values to determine the relative location of a vehicle access device 14. In this case, if the vehicle access device 14 is advertising, then the vehicle access device 14 can only have 15 RSSI values to use for finding the relative location of the vehicle access device 14. As previously discussed, BLE applications limit the minimum allowable advertising interval to greater than or equal to 20 milliseconds. As such, 300 milliseconds/20 milliseconds=15 RSSI values. Fifteen RSSI values may not be sufficient to determine the relative location of the vehicle access device 14 because some of the 15 RSSI values are a result of reflected data from the vehicle access device 14. Considering a similar example as applied to the communication system 10 described in FIGS. 1-4, having an advertisement constraint of 300 milliseconds to gather RSSI values; however, in this case, if the secondary nodes 34b-n advertise at a high duty cycle mode as described above, the vehicle access device collects 80 RSSI values (300 milliseconds/3.75 milliseconds=80 values). Eighty RSSI sample values is a large enough sample to get an RSSI value after filtering to give a good relative location of the vehicle access device 14. In addition, if the system 10 only needs 15 samples to determine the relative location of the vehicle access device 14, the system 10 takes about 56 milliseconds to get the 15 samples (3.75×15=56.25 milliseconds). As such, the system 10 improves the duration from 300 milliseconds to 56 milliseconds, which results in using less power to do the BLE localization operations.

While the access device 14 is described above as being a smartphone, smart watch, or tablet, in some examples, the vehicle access device 14 may be a key fob. In this case, all the nodes 34 of the vehicle 12 act as the main node 34, as a key fob is not under the same power or communication restraints as a smartphone, smart watch, or tablet. As such, each of the nodes 34 are permitted to simultaneously communicate with the key fob 14.

Figure 5:
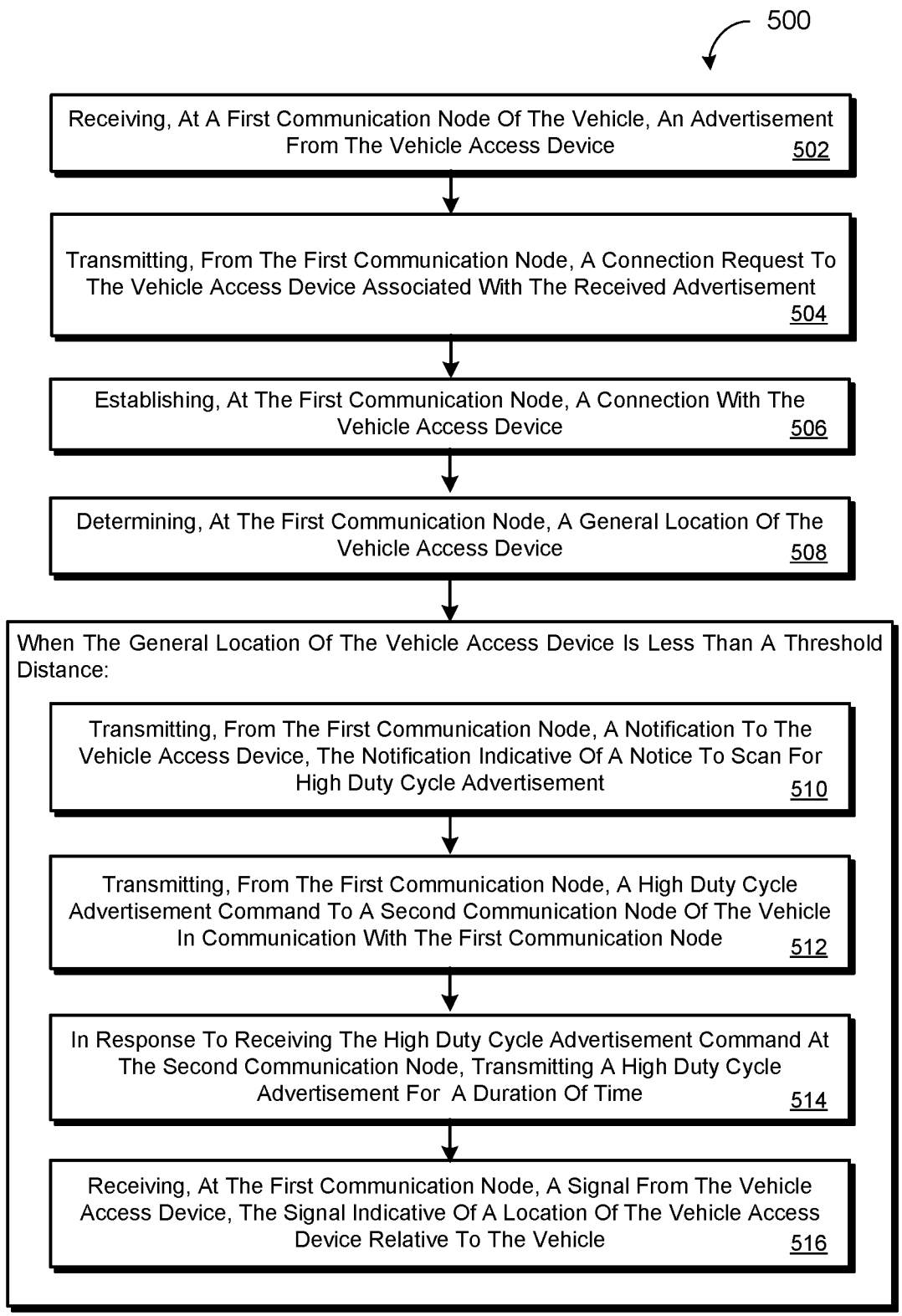
FIG. 5 is a flowchart depicting an example method of communication between a vehicle and a vehicle access device according to the present disclosure.

FIG. 5 provides an example arrangement of operations for a method 500 of determining a location of a vehicle access device 14 relative to a vehicle 12. The method 500 is described with respect to the vehicle 12 and the vehicle access device 14 of the communication system 10 as illustrated in FIGS. 1-4. At block 502, the method 500 includes receiving, at a first communication node (e.g., a main node 34a of the vehicle 12), an advertisement message from the vehicle access device 14; namely from the wireless communication node 52 of the vehicle access device 14. At block 504, the method 500 includes transmitting, from the first communication node 34a, a connection request to the vehicle access device 14 associated with the received advertisement. At block 506, the method 500 includes establishing, at the first communication node 34a, a connection with the vehicle access device 14. In addition, at block 508, the method 500 includes determining, at the first communication node 34a, a general location of the vehicle access device 14. When the general location of the vehicle access device 14 is less than a threshold distance (e.g., five meters or less), at block 510, the method 500 then includes transmitting, from the first communication node 34a, a notification to the vehicle access device 14. The notification is indicative of a notice to scan for high duty cycle advertisements. At block 512, the method 500 includes transmitting, from the first communication node 34a, a high duty cycle advertisement command to a second communication node (e.g., a secondary node 34b-n) of the vehicle 12 in communication with the first communication node 34a. In response to receiving the high duty cycle advertisement command at the second communication node 34b-n, at block 514, the method 500 includes transmitting a high duty cycle advertisement for a duration of time (e.g., 1.28 seconds). In addition, at block 516, the method 500 includes receiving, at the first communication node 34a, a signal from the vehicle access device 14. The signal is indicative of a (smoothed) location of the vehicle access device 14 relative to the vehicle.

Figure 6:
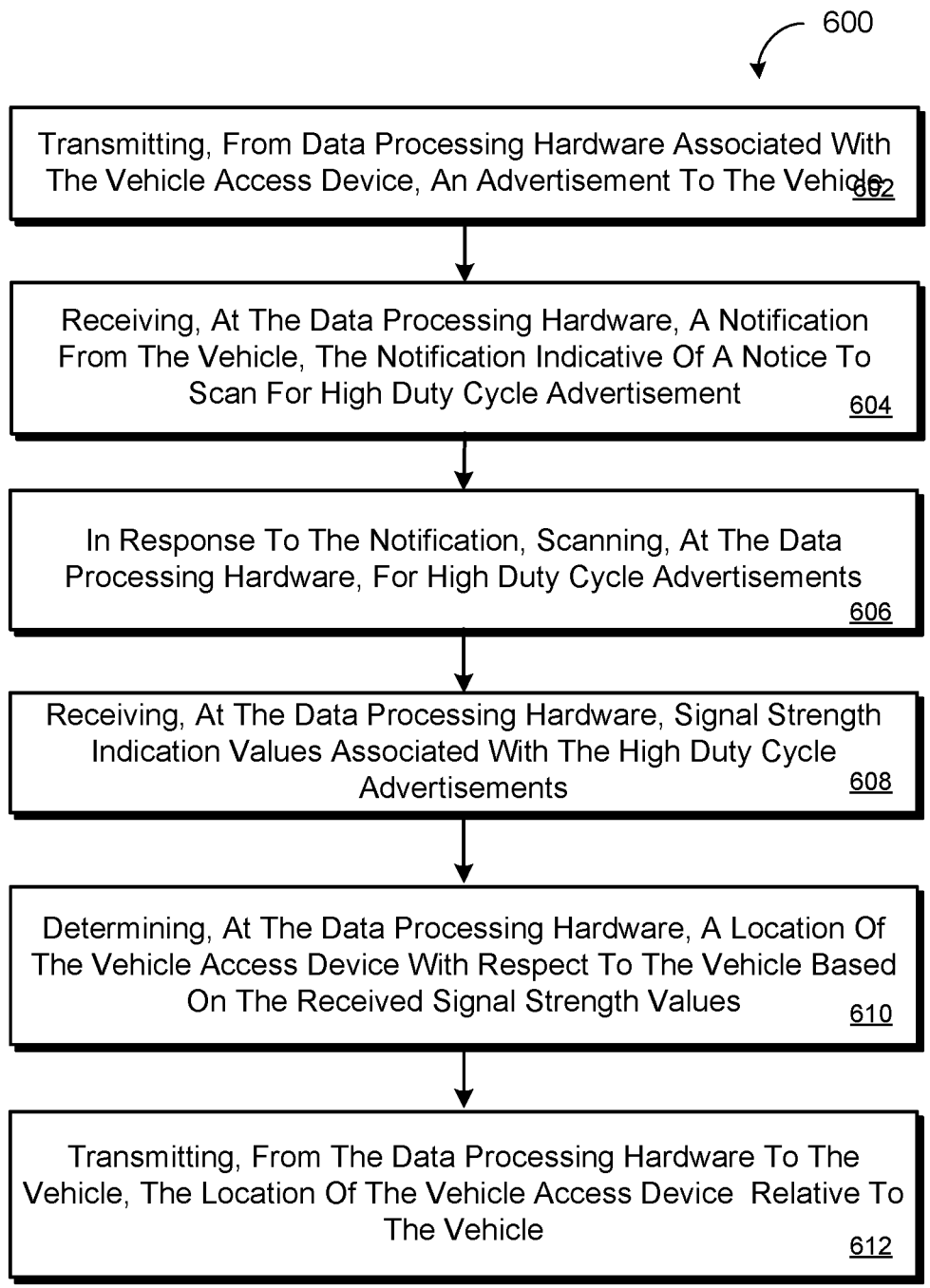
FIG. 6 is a flowchart depicting another example method of controlling a vehicle communication system according to the present disclosure.

FIG. 6 provides an example arrangement of operations for a method 600 of determining a location of a vehicle access device 14 relative to a vehicle 12. The method 600 is described with respect to the vehicle 12 and the vehicle access device 14 of the communication system 10 as illustrated in FIGS. 1-4. At block 602, the method 600 includes transmitting, from data processing hardware 710 associated with the vehicle access device 14, an advertisement to the vehicle 12, and receiving at block 604, at the data processing hardware 710, a notification from the vehicle 12. The notification is indicative of a notice to scan for high duty cycle advertisements. In response to the notification, at block 606, the method 600 includes scanning, at the data processing hardware 710 (e.g., using the wireless communication node 52), for high duty cycle advertisements. At block 608, the method 600 includes receiving, at the data processing hardware 710, signal strength indication values associated with the high duty cycle advertisements. At block 610, the method 600 includes determining, at the data processing hardware 710, a location of the vehicle access device 14 with respect to the vehicle based on the received signal strength values. At block 612, the method 600 includes transmitting, from the data processing hardware 710 to the vehicle 12, the location of the vehicle access device 14 relative to the vehicle 12.

Figure 7:
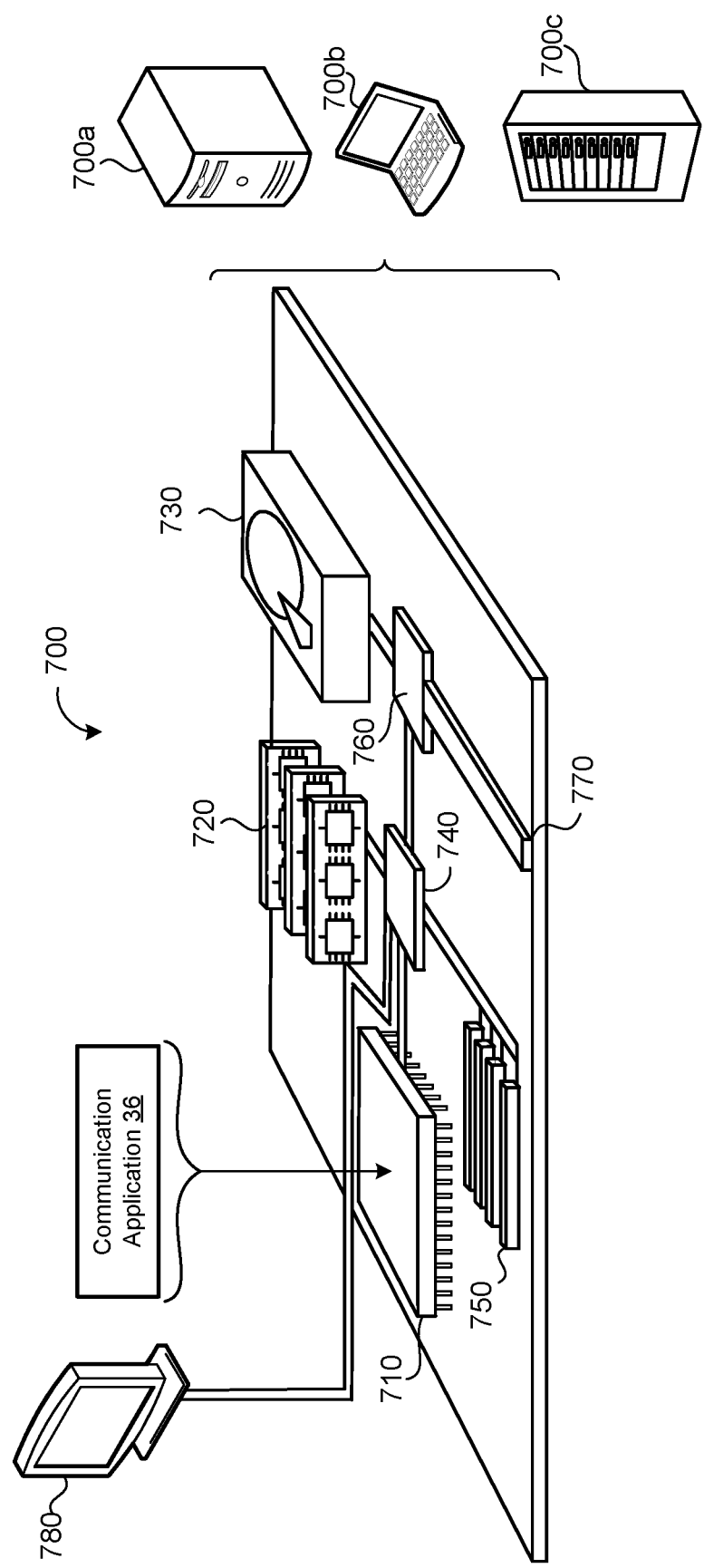
FIG. 7 is a schematic view of an example computing device executing any systems or methods described herein.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to low speed bus 770 and storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. In addition, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and low-speed expansion port 770. The low-speed expansion port 770, which may include various communication ports (e.g., USB, BLUETOOTH®, Ethernet, wireless Ethernet), may be coupled to one or more input/output devices, such as a keyboard, a pointing device, a scanner, or a networking device, such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described here can be realized in digital electronic circuitry, integrated circuitry, specially designed ASICs (application specific integrated circuits), FPGAs (field-programmable gate arrays), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit), or an ASIC specially designed to withstand the high radiation environment of space (known as "radiation hardened", or "rad-hard").

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A method for determining a location of a vehicle access device relative to a vehicle, the method comprising:
   receiving, at a first communication node of the vehicle, an advertisement from the vehicle access device;
   transmitting, from the first communication node, a connection request to the vehicle access device associated with the received advertisement;
   establishing, at the first communication node, a connection with the vehicle access device;
   determining, at the first communication node, a general location of the vehicle access device;
   when the general location of the vehicle access device is less than a threshold distance:
      transmitting, from the first communication node, a notification to the vehicle access device, the notification indicative of a notice to scan for high duty cycle advertisement;
      transmitting, from the first communication node, a high duty cycle advertisement command to a second communication node of the vehicle in communication with the first communication node;
      in response to receiving the high duty cycle advertisement command at the second communication node, transmitting a high duty cycle advertisement for a duration of time; and
      receiving, at the first communication node, a signal from the vehicle access device, the signal indicative of a location of the vehicle access device relative to the vehicle.

2. The method of claim 1, wherein the threshold distance is a distance from the vehicle of about five meters or less.

3. The method of claim 1, wherein the duration of time for transmitting, from the second communication node, the high duty cycle advertisement is about 1.28 seconds.

4. The method of claim 1, further comprising transmitting, from the first and second communication nodes, signal strength indication values to the vehicle access device.

5. The method of claim 1, wherein the first communication node, the second communication node, and the vehicle access device support Bluetooth Low Energy personal area network technology.

6. A system for determining a location of a vehicle access device relative to a vehicle, the system comprising:
   a first communication node configured to:
      receive an advertisement from the vehicle access device;
      transmit a connection request to the vehicle access device associated with the received advertisement;
      establish a connection with the vehicle access device;
      determine a general location of the vehicle access device;
      when the general location of the vehicle access device is less than a threshold distance:
         transmit for a period of time a notification to the vehicle access device, the notification indicative of a notice to scan for high duty cycle advertisement; and
         transmit a high duty cycle advertisement command; and
   a second communication node in communication with the first communication node, the second communication node configured to:
      receive the high duty cycle advertisement command from the first communication node; and
      transmit a high duty cycle advertisement for a duration of time;

wherein in response to transmitting the high duty cycle advertisement for the duration of time, the first communication node receives a signal from the vehicle access device, the signal indicative of a location of the vehicle access device relative to the vehicle.

7. The system of claim 6, wherein the threshold distance is a distance from the system of about five meters or less.

8. The system of claim 6, wherein the duration of time for transmitting, from the second communication node, the high duty cycle advertisement is about 1.28 seconds.

9. The system of claim 6, wherein the first and second communication nodes each transmit signal strength indication values to the vehicle access device.

10. The system of claim 6, wherein the first communication node, the second communication node, and the vehicle access device support Bluetooth Low Energy personal area network technology.

11. A method for determining a location of a vehicle access device relative to a vehicle, the method comprising:
   transmitting, from data processing hardware associated with the vehicle access device, an advertisement to the vehicle;
   receiving, at the data processing hardware, a notification from the vehicle, the notification indicative of a notice to scan for high duty cycle advertisement;
   in response to the notification, scanning, at the data processing hardware, for high duty cycle advertisements;
   receiving, at the data processing hardware, signal strength indication values associated with the high duty cycle advertisements;
   determining, at the data processing hardware, a location of the vehicle access device with respect to the vehicle based on the received signal strength values; and
   transmitting, from the data processing hardware to the vehicle, the location of the vehicle access device relative to the vehicle.

12. The method of claim 11, further comprising receiving, at the data processing hardware, a connection request to connect the data processing hardware to the vehicle.

13. The method of claim 11, wherein the signal strength indication values are received from at least one node of the vehicle.

14. The method of claim 11, wherein the high duty cycle advertisement is received for intervals having a duration of about 1.28 seconds.

15. The method of claim 11, wherein the vehicle access device includes one of a smartphone, a smart watch, and a tablet computing device.

16. A vehicle access device comprising:
   data processing hardware;
   a screen in communication with the data processing hardware; and
   memory hardware in communication with the data processing hardware, the memory hardware storing instructions that when executed on the data processing hardware cause the data processing hardware to perform operations comprising:
      transmit an advertisement to the vehicle;
      receive a notification from a vehicle, the notification indicative of a notice to scan for high duty cycle advertisement;
      in response to the notification, scan for high duty cycle advertisements;
      receive signal strength indication values associated with the high duty cycle advertisements;
      determine a location of the vehicle access device with respect to the vehicle based on the received signal strength values; and
      transmit the location of the vehicle access device relative to the vehicle.

17. The vehicle access device of claim 16, where the operations further include receiving a connection request to connect the data processing hardware to the vehicle.

18. The vehicle access of claim 16, wherein the signal strength indication values are received from at least one node of the vehicle.

19. The vehicle access of claim 16, wherein the high duty cycle advertisement is received for intervals having a duration of about 1.28 seconds.

20. The vehicle access of claim 16, wherein the vehicle access device includes one of a smartphone, a smart watch, and a tablet computing device.

* * * * *